US011074351B2

(12) United States Patent
Hampton et al.

(10) Patent No.: US 11,074,351 B2
(45) Date of Patent: Jul. 27, 2021

(54) LOCATION SPECIFIC IDENTITY VERIFICATION SYSTEM

(71) Applicant: International Business Machines Corporation, Armonk, NY (US)

(72) Inventors: Mark Carl Hampton, Fitzroy North (AU); Timothy M. Lynar, Melbourne (AU); John M. Wagner, Carlton (AU); Stefan von Cavallar, Sandringham (AU)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 16/107,016

(22) Filed: Aug. 21, 2018

(65) Prior Publication Data
US 2020/0065499 A1 Feb. 27, 2020

(51) Int. Cl.
*G06F 21/60* (2013.01)
*H04L 29/06* (2006.01)
(Continued)

(52) U.S. Cl.
CPC ............ *G06F 21/602* (2013.01); *G06T 7/70* (2017.01); *G06T 19/006* (2013.01);
(Continued)

(58) Field of Classification Search
CPC . H04L 9/0816; H04L 9/0872; H04L 63/0428; G06F 21/602; G06F 16/24575;
(Continued)

(56) References Cited

U.S. PATENT DOCUMENTS 5,987,136 A * 11/1999 Schipper ............ H04N 1/32203
713/176
8,938,257 B2 1/2015 Chao et al.
(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Kevin Bechtel
*Assistant Examiner* — Sangseok Park
(74) *Attorney, Agent, or Firm* — Heslin Rothenberg Farely & Mesiti P.C.; Scott Dobson, Esq.

(57) ABSTRACT

A method, computer program product, and a system where a processor(s), obtains pre-recorded visual data from a given location, captured by an image capture device at a visual input location at the given location. The processor(s) determines a position of the image capture device utilized to capture the visual data. The processor(s) obtains known landmarks from data related to the given location. The processor(s) analyzes the visual data to identify a portion of the known landmarks in the visual data, where the analyzing generates matched landmarks. The processor(s) determines a spatial orientation and positioning of the visual input location with respect to the matched landmarks, at the given location. The processor(s) generates an encryption key, utilizing the spatial orientation and the positioning of the visual input location with respect to the matched landmarks. The processor(s) encrypts a message with the encryption key, generating an encrypted message.

16 Claims, 7 Drawing Sheets

(51) Int. Cl.
   *H04L 9/08*     (2006.01)
   *G06T 7/70*     (2017.01)
   *G06T 19/00*    (2011.01)

(52) U.S. Cl.
   CPC .......... *H04L 9/0816* (2013.01); *H04L 9/0872* (2013.01); *H04L 63/0428* (2013.01); *G06F 2221/2111* (2013.01); *G06T 2207/20101* (2013.01)

(58) Field of Classification Search
   CPC ........... G06T 7/70; G06T 19/006; G01S 5/16; G01C 21/206; G01C 21/3602
   See application file for complete search history.

(56) References Cited

U.S. PATENT DOCUMENTS

| | | | |
|---|---|---|---|
| 9,222,783 B2 | 12/2015 | Kansai et al. | |
| 9,740,846 B2 | 8/2017 | Smith | |
| 9,811,653 B1 | 11/2017 | Maresh et al. | |
| 2013/0045751 A1* | 2/2013 | Chao | G01C 21/206 455/456.1 |
| 2014/0164761 A1* | 6/2014 | Kufluk | H04L 63/10 713/155 |
| 2014/0171039 A1* | 6/2014 | Bjontegard | A63F 13/217 455/414.1 |
| 2016/0275350 A1 | 9/2016 | Raynaud et al. | |
| 2017/0352099 A1* | 12/2017 | Howe | G06Q 40/08 |

\* cited by examiner

LOCATION SPECIFIC IDENTITY VERIFICATION SYSTEM

BACKGROUND

Part of verifying the identity of an individual can include verifying the location of that individual. Many attempts at impersonating verified users come from unexpected geographic areas and the supposed presence of the verified users in the unexpected areas provide insights to security systems and individuals that these users may not be who they claim to be. Additionally, there are a number of advantages to ensuring that a person (e.g., a user) is at or has visited a given location. For example, a recipient of a call regarding a financial account may wish to verify that the call has originated from the financial institution associated with the account. Additionally, an employer, having dispatched technicians for an on-site job, may wish to verify that the technicians arrived at the location where the job was requested.

Existing methods of verifying the location of a user suffer from security shortcomings and are therefore not consistently effective. For example, in existing methods, when verifying the location of an entity, such as a person, computer systems often rely upon a number of checks that include using a global positioning system (GPS) as well as geo-referencing. However, these security checks can be bypassed by "spoofing" a location (spoofing refers to measures taken by a user to deceive computer systems and/or other users, in this case, faking a location). Therefore the only reliable means of verifying the location of a user (and possibly verifying the identity of the user in part by utilizing this location data) is to utilize a technical architecture where the computer system performing the verification is at the same location as the user. Given that many modern computing architectures utilize distributed resources and virtual resources, relying on a computer system to be at the same location as a user is neither realistic, nor workable, as a location verification solution.

SUMMARY

Shortcomings of the prior art are overcome and additional advantages are provided through the provision of a method of location verification. The method includes, for instance: obtaining, by one or more processors, pre-recorded visual data from a given location, captured by an image capture device at a visual input location at the given location; determining, by the one or more processors, a position of the image capture device utilized to capture the visual data; obtaining, by the one or more processors, known landmarks from data related to the given location; analyzing, by the one or more processors, the visual data to identify a portion of the known landmarks in the visual data, wherein the analyzing comprises utilizing sub-features in the visual data and the data to match known landmarks to objects in the visual data, wherein each pair of matched known landmark to object comprises a matched landmark and wherein the analyzing generates matched landmarks; determining, by the one or more processors, utilizing the matched landmarks and the position of the image capture device, a spatial orientation and positioning of the visual input location with respect to the matched landmarks, at the given location; generating, by the one or more processors, an encryption key, utilizing the spatial orientation and the positioning of the visual input location with respect to the matched landmarks; and encrypting, by the one or more processors, a message with the encryption key generating an encrypted message, wherein based on obtaining a decrypted version of the encrypted message from a given client, the one or more processors verifies that the given client is located at the given location.

Shortcomings of the prior art are overcome and additional advantages are provided through the provision of a computer program product for verifying a location. The computer program product comprises a storage medium readable by a processing circuit and storing instructions for execution by the processing circuit for performing a method. The method includes, for instance: obtaining, by one or more processors, pre-recorded visual data from a given location, captured by an image capture device at a visual input location at the given location; determining, by the one or more processors, a position of the image capture device utilized to capture the visual data; obtaining, by the one or more processors, known landmarks from data related to the given location; analyzing, by the one or more processors, the visual data to identify a portion of the known landmarks in the visual data, wherein the analyzing comprises utilizing sub-features in the visual data and the data to match known landmarks to objects in the visual data, wherein each pair of matched known landmark to object comprises a matched landmark and wherein the analyzing generates matched landmarks; determining, by the one or more processors, utilizing the matched landmarks and the position of the image capture device, a spatial orientation and positioning of the visual input location with respect to the matched landmarks, at the given location; generating, by the one or more processors, an encryption key, utilizing the spatial orientation and the positioning of the visual input location with respect to the matched landmarks; and encrypting, by the one or more processors, a message with the encryption key generating an encrypted message, wherein based on obtaining a decrypted version of the encrypted message from a given client, the one or more processors verifies that the given client is located at the given location.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
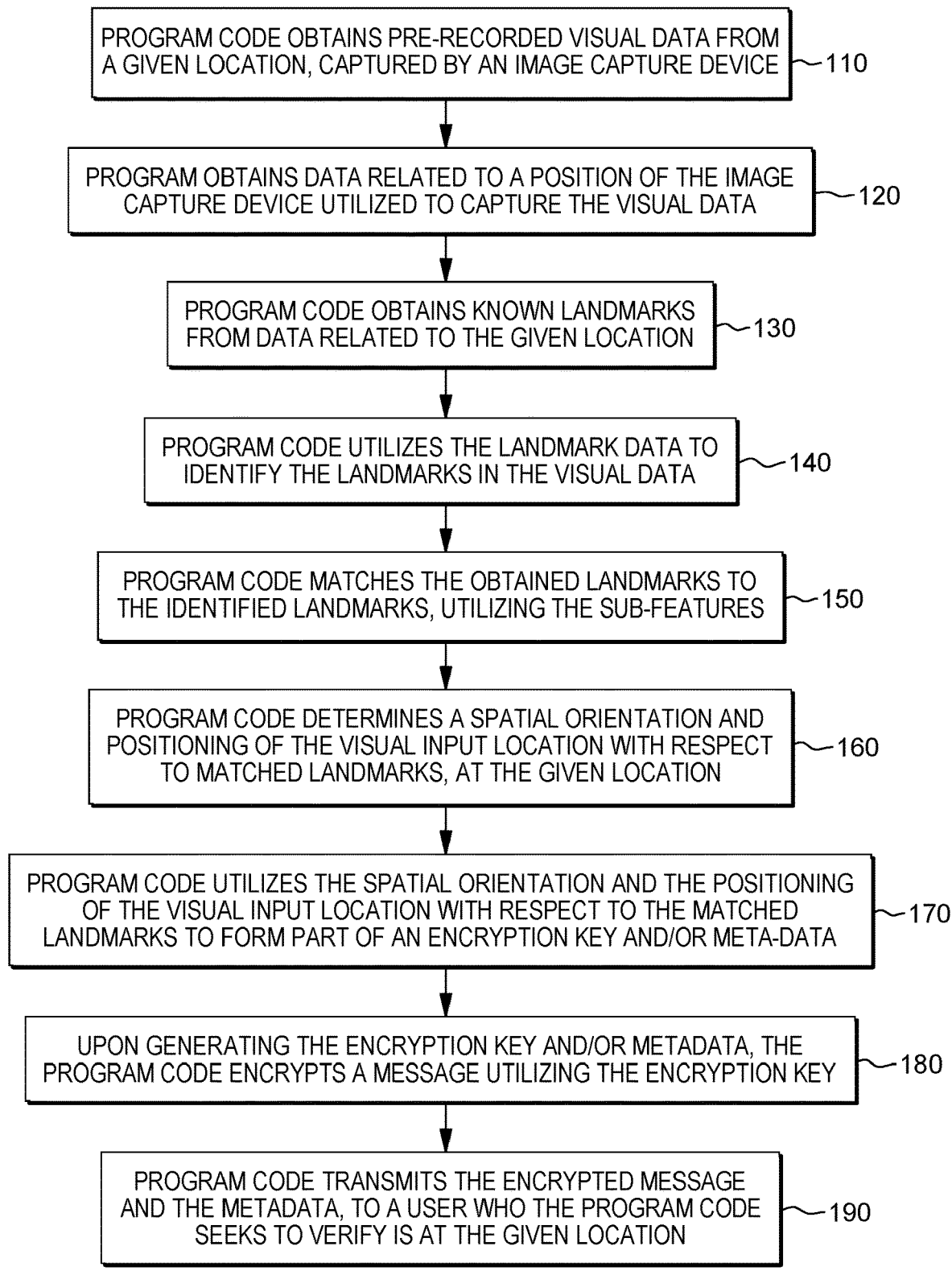
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
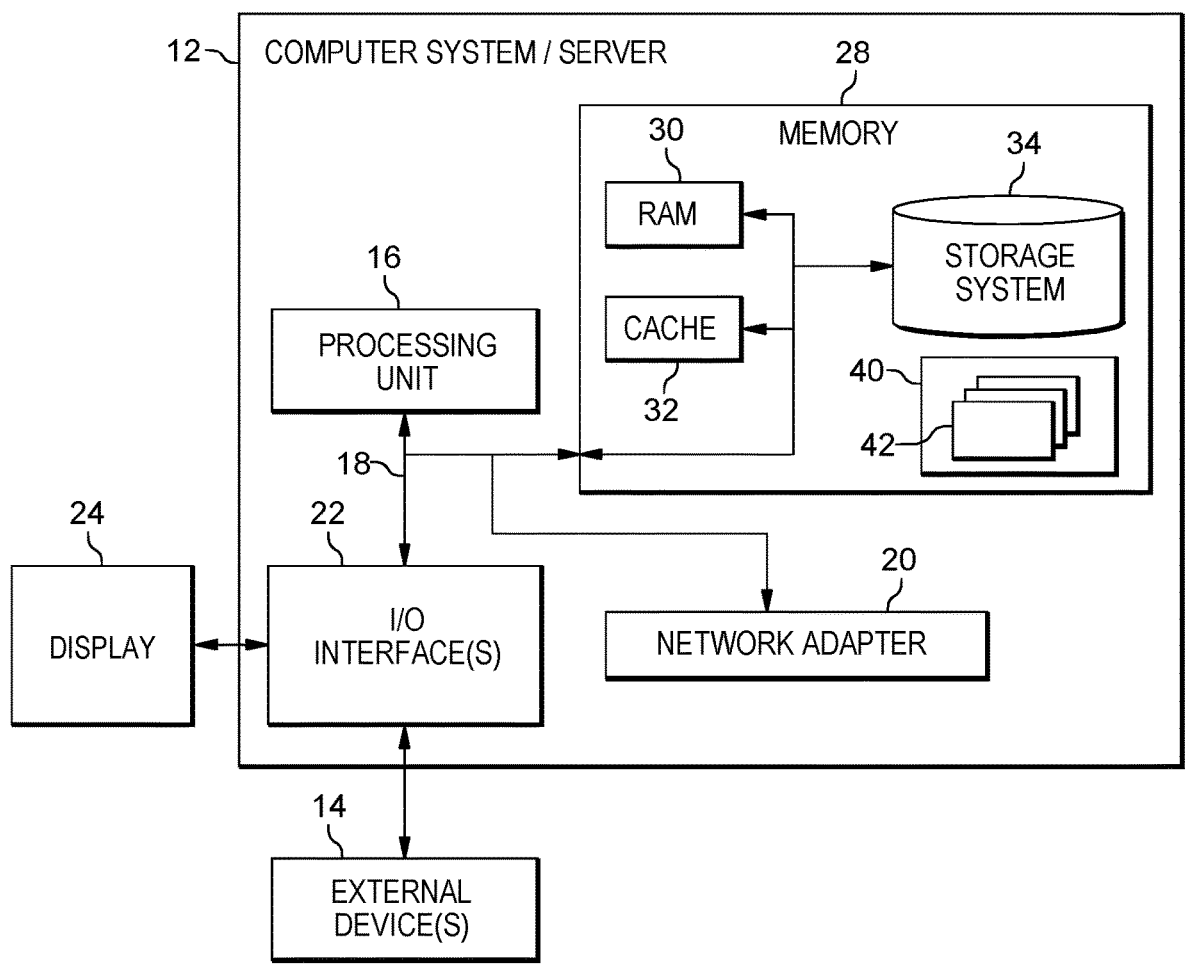
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilize a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments of the present invention include a computer-implemented method, a computer program product, and a computer system that include program code executed on at least one processing circuit that encrypts and decrypts information that uniquely identifies a location, enabling only a user spatially located and oriented in that location to encrypt and/or decrypt a given message. The program code generates and provides a user with an encrypted message that the user can only decrypt if that user is physically at a given location. In some embodiments of the present invention, the program code utilizes location-specific visual cues in the encryption and decryption of data then utilized to confirm that a given entity is at that location. Specifically, program code encrypts a message by comparing known landmarks at a given location with visual data (images, video) captured at the location by an image capture device, and utilizes calculations related to the positioning of the device relative to the landmarks to create an encryption key and, in some embodiments, meta-data, to encrypt and transmit a message to a user at the given location. Upon receipt of the encrypted message, the user can decrypt the message to verify that the user is at the given location. In embodiments of the present invention, the user obtains the encrypted message from the program code and utilizes a personal computing device to derive a decryption key, having been provided, by the program code, with the position of the device utilized in generating the message. By utilizing the same positioning, the computing device can provide the program code with a location verification by decrypting the message by utilizing a decryption key generated from the location-specific visual cues of the device, as related to the landmarks. Thus, the program code determines that the user is at the given location based on a proof; the user proves the user's location by reproducing location-specific visual cues originally generated by the program code.

Embodiments of the present invention are inextricably linked to computing and provide advantages over existing location verification techniques. First, embodiments of the present invention are inextricably linked to computing because they comprise an electronic identity verification system that utilizes electronic location verification, which is accomplished through computing technology including, but not limited to, electronic image capture, image analysis and recognition, database querying and data retrieval, and GPS or a Global Navigation Satellite System (GLONAS)) technologies. Second, aspects of some embodiments of the present invention provide advantages over existing location verification approaches by including program code that adds layers of security over existing techniques, to prevent location spoofing; location spoofing is a security risk because it allows users to circumvent location validation security measures and is an issue in existing approaches. Program code in embodiments of the present invention performs novel aspects that mitigate spoofing and thus, enable embodiments of the present invention to verify a location of a user, accurately, including, but not limited to: 1) utilizing visual cues for the encryption and decryption of data; 2) providing the visual cues in an augmented reality application; 3) generating multiple keys from a given location for use in the verification; and 4) utilizing the multiple generated keys from the location to facilitate a (location) match under various environmental conditions (e.g., estimated times of day, perspectives). Some existing approaches verify a user based on a user capturing and transmitting a picture of a known landmark at a given location, but without the visual cues utilized in embodiments of the present invention, this existing approach can be spoofed because the integrity of this image transmission is not verified for anything other than the content of a single landmark. Some existing approaches utilize a simple image matching where an image captured in real-time is matched to a stored image, however, this technique is also insecure based on this singular verification step. Another existing technique limits the timing and controls regarding when an image that is used for verification comparison must be captured, such that it is captured at login. Again, this technique does not utilize visual cues or message encryption to verify location, which are additional levels of security that add to the integrity of embodiments of the present invention.

In embodiments of the present invention, program code executing on at least one processor utilizes location specific visual cues to encrypt and enable the decryption of data that the program code can subsequently utilize as a location specific confirmation of an entity. Beyond providing additional security above the existing techniques described above, aspects of embodiments of the present invention also provide a secure location verification system because the decryption key, which is required to verify location, will naturally expire over an indeterminate time because of the natural change of landmarks and locations over time. The encryption/decryption utilized in embodiments of the present invention is additionally scalable according to the composition and complexity of the associated landmarks. The duration of a key can also be controlled by utilizing a restricted set of known landmarks (i.e., the greater the set of landmarks, the more landmarks can be detected, and the greater the chance for a change to impact the key's duration).

FIG. 1 is a workflow 100 that illustrates certain aspects of some embodiments of the present invention that comprise the encryption process. As discussed above, the program code generates and transmits an encrypted message, which is then decrypted by a user and in decrypting the message, the location of the user is verified. In embodiments of the present invention, the program code obtains pre-recorded visual data from a given location, captured by an image capture device (110). The given location refers to a general location of a user while a visual input location refers to a more exact location of an input device (e.g., image capture device) utilized to capture visual data utilized by the program code in a subsequent location verification. It is this given location that the program code is verifying that the user is present at. In some embodiments of the present invention, the visual data is an image, a series of images, and/or a video. The visual data can be collected at a given location specifically by a device at a visual input location, before the program code encrypts a message and/or contemporaneous with the commencement of an encryption workflow 100.

In some embodiments of the present invention, the program code receives the visual data captured at the given location from a trusted source, including but not limited to, a trusted user and/or a surveillance device at the given location, which the one or more processors executing the program code are communicatively coupled to. In an embodiment of the present invention, the program obtains data related to a position of the image capture device utilized to capture the visual data (120). In some embodiments of the present invention, the positioning information of the image capture device includes, but is not limited to, height, angle, and geo-location (i.e., utilizing GPS or GLONAS). Thus, the positioning information helps define the visual input location, which can include coordinates as well as the orientation of the image capture device in three-dimensional space.

In embodiments of the present invention, to generate an encryption key, the program code coordinates general data related to the given location with the visual data. To this end, returning to FIG. 1, the program code obtains known landmarks from data related to the given location (130). In some embodiments of the present invention, the program code obtains the landmark data from publicly or privately available databases. The program code utilizes the landmark data to identify the landmarks in the visual data (140). Identifying the landmarks includes identifying sub-features (i.e., aerials), colors, patterns (i.e., brickwork, fencing style), text, and/or shapes. The program code matches the obtained landmarks to the identified landmarks, utilizing the sub-features (i.e., aerials), colors, patterns (i.e., brickwork, fencing style), text, and/or shapes (150). In some embodiments of the present invention, the program code attempts to identify a fixed set of landmarks in the visual data, in order to use each landmark as a separate verification point when validating the location of a user.

Based on matching the identified landmarks in the visual data to the landmarks obtained (e.g., from a database), based on the given location, the program code determines a spatial orientation and positioning of the visual input location with respect to matched landmarks, at the given location (160). Hence, the program code determines the positioning of the image capture device relative to the landmarks, as the program code had previously determined the position of the image capture device when capturing the images, which have now been identified to contain one or more landmarks, which were also known landmarks, per at least one data source. In some embodiments of the present invention, the program code determines the spatial orientation and the positioning of the visual input location with respect to matched landmarks by analyzing a relative size and location of matched landmarks from the (previously determined) location of the acquisition of the visual data by the image capture device. In some embodiments of the present invention, the program code checks the spatial orientation and the positioning of the matched landmarks, with respect to each other, as an additional reference point.

In the illustrated embodiment of the present invention, the program code utilizes the spatial orientation and the positioning of the visual input location with respect to the matched landmarks to form part of an encryption key and/or meta-data (170). Upon generating the encryption key and/or metadata, the program code encrypts a message utilizing the encryption key (180). The program code transmits the encrypted message and can also transmit the metadata, to a user who the program code seeks to verify is at the given location (190). In some embodiments of the present invention, the program code generates the encrypted message, including obtaining pre-recorded visual data from the given location, captured by the image capture device (110), based on receiving a request to verify the user.

Figure 2:
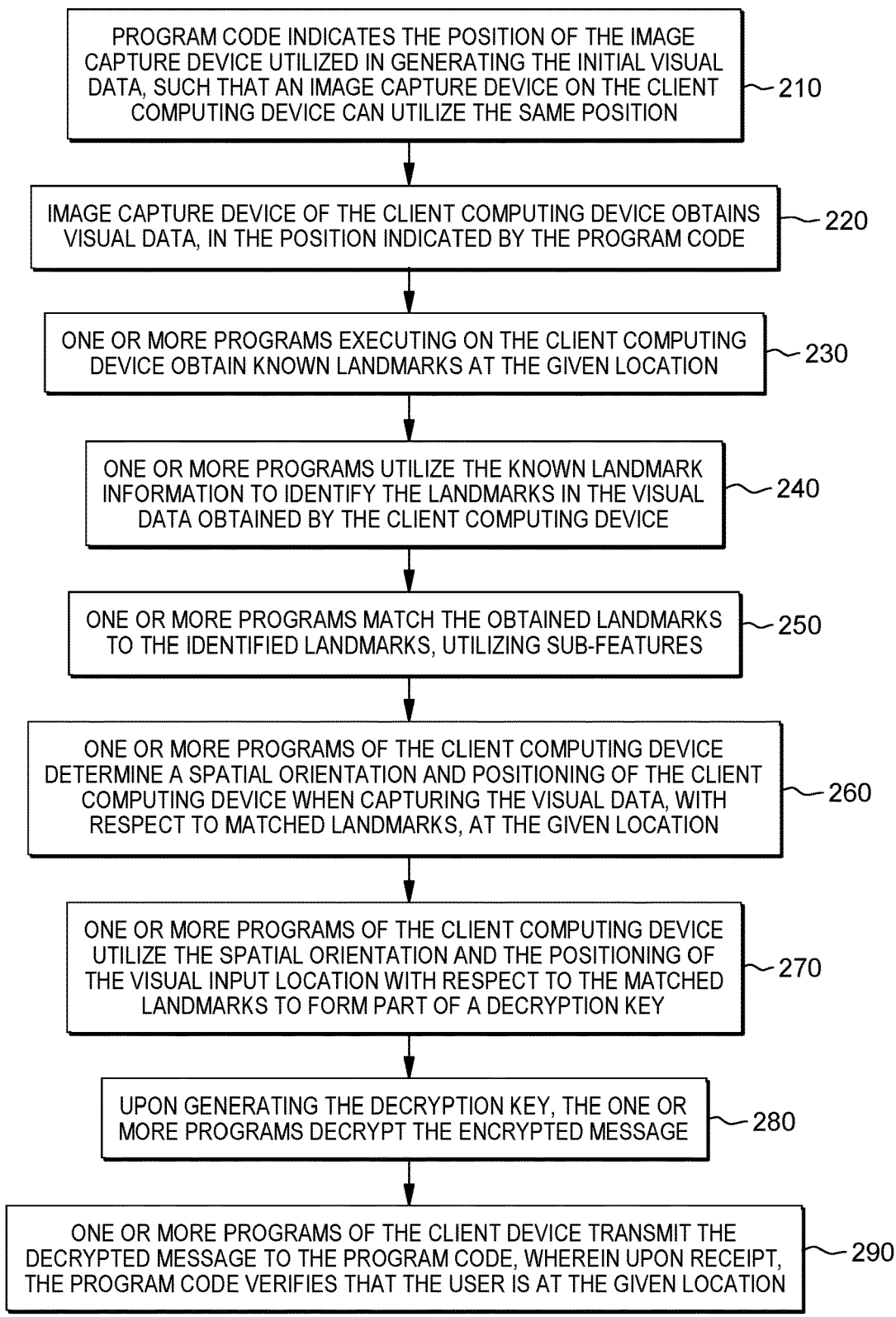
FIG. 2 is a workflow illustrating certain aspects of an embodiment of the present invention.

FIG. 2 is a workflow 200 that illustrates decryption of the encrypted message by a given user and hence, verification that the user is at the given location, by the program code. As illustrated in FIG. 2, the user can only decrypt the message (and therefore enable the program code to verify the user's location) if the user can reproduce the visual input location relative to the matched landmarks utilized when generating the encryption key. In an embodiment of the present invention a user, utilizing a client computing device, obtains the encrypted message and can also obtain the metadata, in some embodiments of the present invention. Based on obtaining the encrypted message and metadata, the program code indicates the position of the image capture device utilized in generating the initial visual data, such that an image capture device on the client computing device can utilize the same position (210). The program code can indicate this position through lights and/or actuation of the image capture device on the client computing device. The image capture device of the client computing device obtains visual data (e.g., records video, captures one or more images, etc.), while in the position indicated by the program code (220). Provided that the user is, in fact, at the given location, the user should be able to produce visual data (images, video) with a similar vantage point to the visual data initially utilized to generate the encryption key.

Returning to FIG. 2, one or more programs executing on the client computing device obtain known landmarks at the given location (230). The one or more programs can obtain this known landmark information from a publicly or privately available data source. The one or more programs utilize the known landmark information to identify the landmarks in the visual data obtained by the client computing device (240). Identifying the landmarks includes identifying sub-features (i.e., aerials), colors, patterns (i.e., brickwork, fencing style), text, and/or shapes. The one or more programs match the obtained landmarks to the identified landmarks, utilizing the sub-features (i.e., aerials), colors, patterns (i.e., brickwork, fencing style), text, and/or shapes (250). In some embodiments of the present invention, a set of landmarks obtained for a given location and utilized as reference points to match with identified landmarks can be a fixed set of landmarks. Thus, for a given location, the landmarks utilized, and therefore obtained by either the program code or by the one or more programs executing on the client device, can be pre-defined.

Based on matching the identified landmarks in the visual data from the client computing device to the landmarks obtained (e.g., from a database), based on the given location, the one or more programs of the client computing device determine a spatial orientation and positioning of the client computing device when capturing the visual data, with respect to matched landmarks, at the given location (260). Hence, the one or more programs determine the positioning of the image capture device of the client, relative to the landmarks, as the program code, in the encryption key generation process of FIG. 1, had previously dictated the position of the image capture device, when capturing the images. In some embodiments of the present invention the one or more programs determine the spatial orientation and the positioning of the visual input location with respect to matched landmarks by analyzing a relative size and location of matched landmarks from the (previously determined) location of the acquisition of the visual data by the image capture device of the client. In some embodiments of the present invention, the one or more programs check spatial orientation and the positioning of the matched landmarks, with respect to each other, as an additional reference point.

In an embodiment of the present invention, the one or more programs of the client computing device utilize the spatial orientation and the positioning of the visual input location with respect to the matched landmarks to form part of a decryption key (270). Upon generating the decryption key, the one or more programs decrypt the encrypted message (280). The one or more programs of the client device transmit the decrypted message to the program code, where upon receipt, the program code verifies that the user is at the given location (290).

Figure 3:
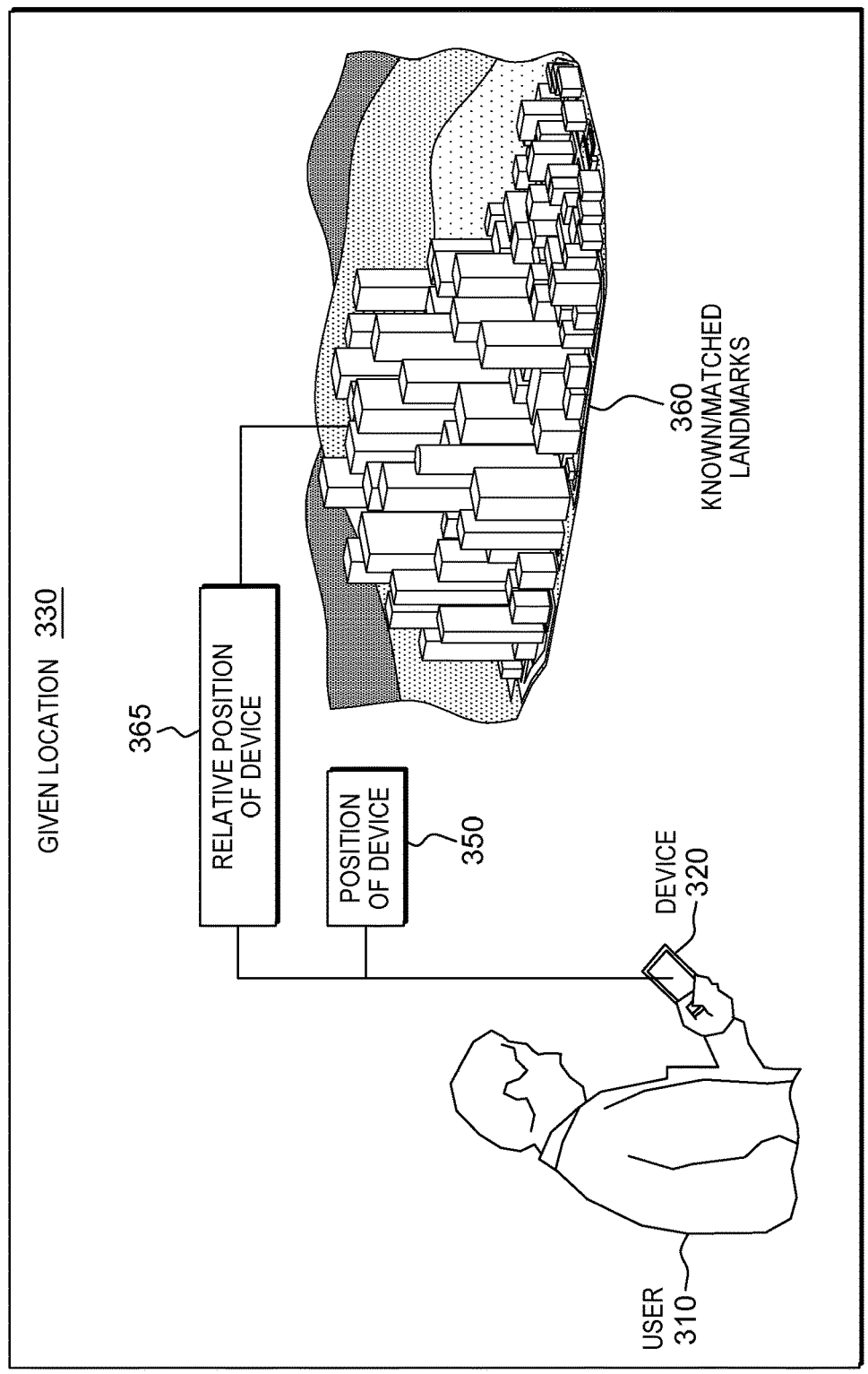
FIG. 3 is an illustration of various aspects of an environment into which aspects of embodiments of the present invention may be implemented.

FIG. 3 is an example of an environment 300 into which aspects of the present invention to verify user location (and possibly identity, based on location) can be implemented. Aspects of embodiments of the present invention can be implemented in a variety of different embodiments and technical architectures. In some embodiments of the present invention, the program code that encrypts the message and or decrypts the message to verify the location of a user is utilized in one or more of: an augmented reality application and/or a stand-alone application. In some embodiments of the present invention, aspects of the present invention are utilized as a component of a geographically-locked software or media protection system.

In FIG. 3, a user 310 operates a client device 320 is at a given location 330. The user, via the client device 320, requests access to data from one or more resources of a computing system 340 (e.g., a distributed computing system, a cloud computing system), where program code executing on one or more processors of the computing system 340 is authorized to provide this access to verified users, only.

Thus, in order to provide the access requested by the user 310, via the client device 320, the program code attempts to verify that the user 310 is present at the given location 330. This location verification can constitute an entirety of a verification process or merely one layer of security in a verification process. One example of an application where aspects of the present invention can be implemented is in an augmented reality game. In an augmented reality game, users can be required to be located at one or more exact location. In order to ensure that these users cannot spoof/cheat the game, the augmented reality game can utilize the location confirmation aspects of embodiments of the present invention to ensure and confirm that users are spatially located and oriented in a required location. The user confirms the user's location, as illustrated in FIG. 2, by decrypting a message utilizing detected landmarks and features only visible from that location. If the user decrypts all details correctly, the augmented reality game can confirm that the user is at the correct location and the user can advance in the game.

Returning to FIG. 3, to verify that the user 310 is present at the given location 330, the program code obtains visual data from the given location 330. The visual data can be images captured contemporaneously with the user's request, by a trusted source. The trusted source (or whomever or whatever captures and provides this visual data to the program code) obtains the visual data at a given orientation and/or position 350 within the given location 330. With the visual data obtained, the program code also determines the position 350 of the image capture device utilized by the trusted source when capturing (e.g., recording) the visual data. Thus, the program code determines that the visual data was captured at the given location 330 with the image capture device at the given orientation and/or position 350.

The program code obtains (e.g., from external data sources) known landmarks 360 at the given location 330. The program code utilizes the landmark data to identify the landmarks 360 in the visual data, which can include identifying sub-features (i.e., aerials), colors, patterns (i.e., brickwork, fencing style), text, and/or shapes. The program code matches the obtained known landmarks 360 to the identified landmarks, utilizing the sub-features. The program code then determines the spatial orientation and positioning of the image capture device utilized to obtain the visual data 350, at the given location 330, relative to the matched landmarks (the matched landmarks can be all or a subset of the known landmarks 360, as the position of the image capture device can determine how many of the known landmarks would appear in the visual data). The program code generates an encryption key utilizing the spatial orientation and the positioning of the image capture device, relative to the matched landmarks 365, to form part of an encryption key and metadata and encrypts a message with this key. The program code transmits the encrypted message and metadata to the client device 320.

As discussing in FIG. 2, in order to decrypt the message, and to obtain the requested access, the client device 320, when provided with the spatial orientation and the positioning of the image capture device, via the meta-data, must capture visual data at a similar orientation. Capturing this visual data will enable the client device to generate a decryption key. By transmitting the decrypted message to the computing system 340, the program code can verify that the user 310 is at the given location 330 and provide the user 110 with the requested access.

Figure 4:
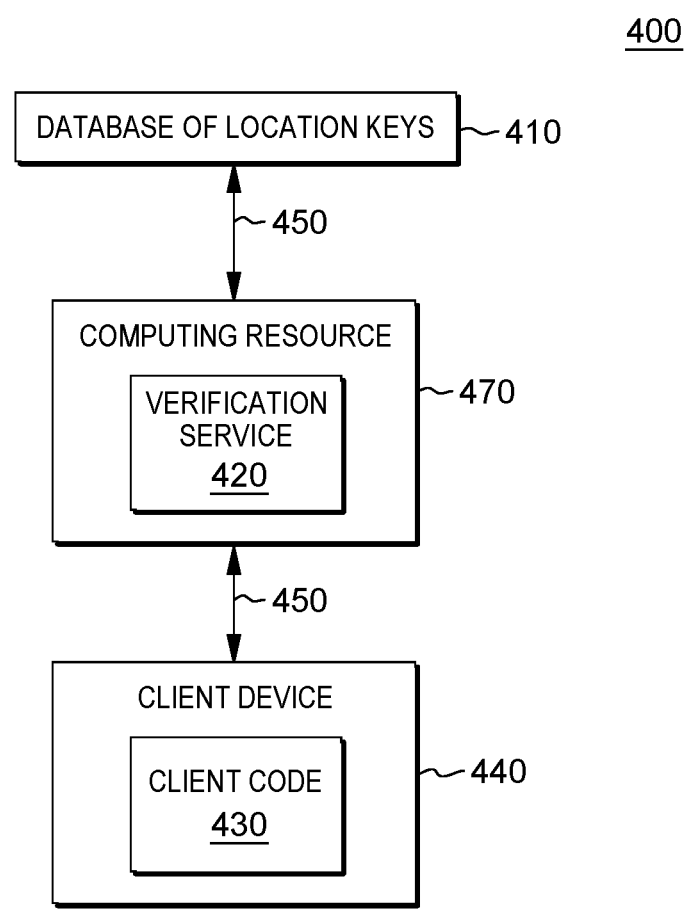
FIG. 4 is an illustration of various aspects of an implementation of some embodiments of the present invention may be implemented.

FIG. 4 is a technical implementation 400 of certain aspects of some embodiments of the present invention. This figure is provided merely to show one possible distribution of certain functionalities of the present invention in various modules, but as understood by one of skill in the art, this distribution of functionality provides one non-limiting example for illustrative purposes. In some embodiments of the present invention, a technical implementation 400 consists of three components: a database of location keys 410, a service to execute verifications 420, executing on at least one computing resource 470, and a client code 430 (e.g., the decryption key) on a user's client device 440. In some embodiments of the present invention, the location key database 410 contains keys for locations to be verified.

The location key database 410 can contain multiple versions of the keys to account for time of day and/or season if there are significant differences to take into account. Because decryption and verification depend upon capturing images that match previously created images that were utilized to create an encryption key, and the images can vary based on the time of day (e.g., day or night) and/or the season (e.g., a park or mountain can be covered in snow and thus change color, or seasonal coverings, awnings, etc., can be added or removed on buildings), utilizing a key generated based on images that are potentially similar to those that could be generated by a user at a correct location enables accurate location verification by the program code.

The verification service 420 includes the program code, available over a network 450, to provide a user with an encrypted message and to verify a decrypted message. In some embodiments of the present invention, the verification service 420 obtains a location at which a user requires verification, obtains a key from the location key database 410, encrypts a message utilizing the key, and transmits the message to the user. The verification service 420 also verifies a response from the user. Thus, the verification service 420 is available over the network 450 to take match requests from the client device 440 and verify locations.

On the client device 440, the client code 430 accesses the location services (e.g., GPS), image capture device, and other sensors and can provide the photo verification, including the decryption of the message. In some embodiments of the present invention, a client device 440 can include additional security to ensure that the device is being used by the intended user. For example, embodiments of the present invention can include a communication handshake to ensure the device is being used by the user. For example, a user could take a selfie (i.e., a photograph or still image that a one has taken of oneself, typically one taken with a smartphone or webcam and shared via social media) at the location with the appropriate orientation. Thus, in some embodiments of the present invention, using the front facing camera of a smartphone, the user takes a selfie with the background in it, and the verification service 420 checks against the image of the user, as well as the background elements, for the latter, utilizing the encryption and decryption described on FIGS. 1-2.

Embodiments of the present invention include a computer-implemented method, a computer program product, and a computer system where program code executing on one or more processors obtains pre-recorded visual data from a given location, captured by an image capture device at a visual input location at the given location. The program code determines a position of the image capture device utilized to capture the visual data. The program code obtains known landmarks from data related to the given location. The program code analyzes the visual data to identify a portion of the known landmarks in the visual data, where the analyzing comprises utilizing sub-features in the visual data and the data to match known landmarks to objects in the visual data, where each pair of matched known landmark to object comprises a matched landmark and where the analyzing generates matched landmarks. The program code determines, utilizing the matched landmarks and the position of the image capture device, a spatial orientation and positioning of the visual input location with respect to the matched landmarks, at the given location. The program code generates an encryption key, utilizing the spatial orientation and the positioning of the visual input location with respect to the matched landmarks. The program code encrypts a message with the encryption key generating an encrypted message, where based on obtaining a decrypted version of the encrypted message from a given client, the one or more processors verifies that the given client is located at the given location.

In some embodiments of the present invention, the program code obtains a request from a client for verifying that the client is at the given location. Based on obtaining the request, the program code transmits the encrypted message to the client, where the client decrypts the message. The program code verifies that the client is at the given location based on obtaining a decrypted version of the encrypted message from the client. The transmitting can include the program code indicating the position of the image capture device to the client. This indicating can include the program code indicating the position with an element selected from the group consisting of: lights and actuation of an image capture device on the client.

In some embodiments of the present invention, the client generates a decryption key, where the client utilizes the decryption key to decrypt the encrypted message. The client can generate the decryption key by obtaining, by an image capture device of the client, new visual data, where the image capture device of the client is in the position during the obtaining. The client obtains the known landmarks at the given location from the data related to the given location. The client analyzes the new visual data to identify the portion of the known landmarks in the new visual data, where the analyzing comprises utilizing sub-features in the new visual data and the data to match known landmarks to objects in the new visual data, where each pair of matched known landmark to object comprises a new matched landmark and where the analyzing generates new matched landmarks, where the new matched landmarks comprise the matched landmarks. The client determines, utilizing the new matched landmarks and the position, a client spatial orientation and positioning with respect to the new matched landmarks, where the client spatial orientation and positioning is equivalent to the spatial orientation and positioning of the visual input location with respect to the matched landmarks, at the given location. The client generates the decryption key, utilizing the client spatial orientation and the positioning.

In some embodiments of the present invention, the sub-features are selected from the group consisting of: aerials, colors, patterns, text, and shape. In some embodiments of the present invention, the sub-features comprise patterns and the patterns are selected from the group consisting of: brickwork and fencing style.

In some embodiments of the present invention, the client is engaged in an augmented reality game.

In some embodiments of the present invention, the visual data is selected from the group consisting of: an image, a series of images, a group of images, and a video.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of implementing and/or performing any of the functionality set forth hereinabove. In an embodiment of the present invention resources of the computing system 340 (FIG. 3) and the at least one computing resource 470 (FIG. 5) can each be understood as a cloud computing node 10 (FIG. 5) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
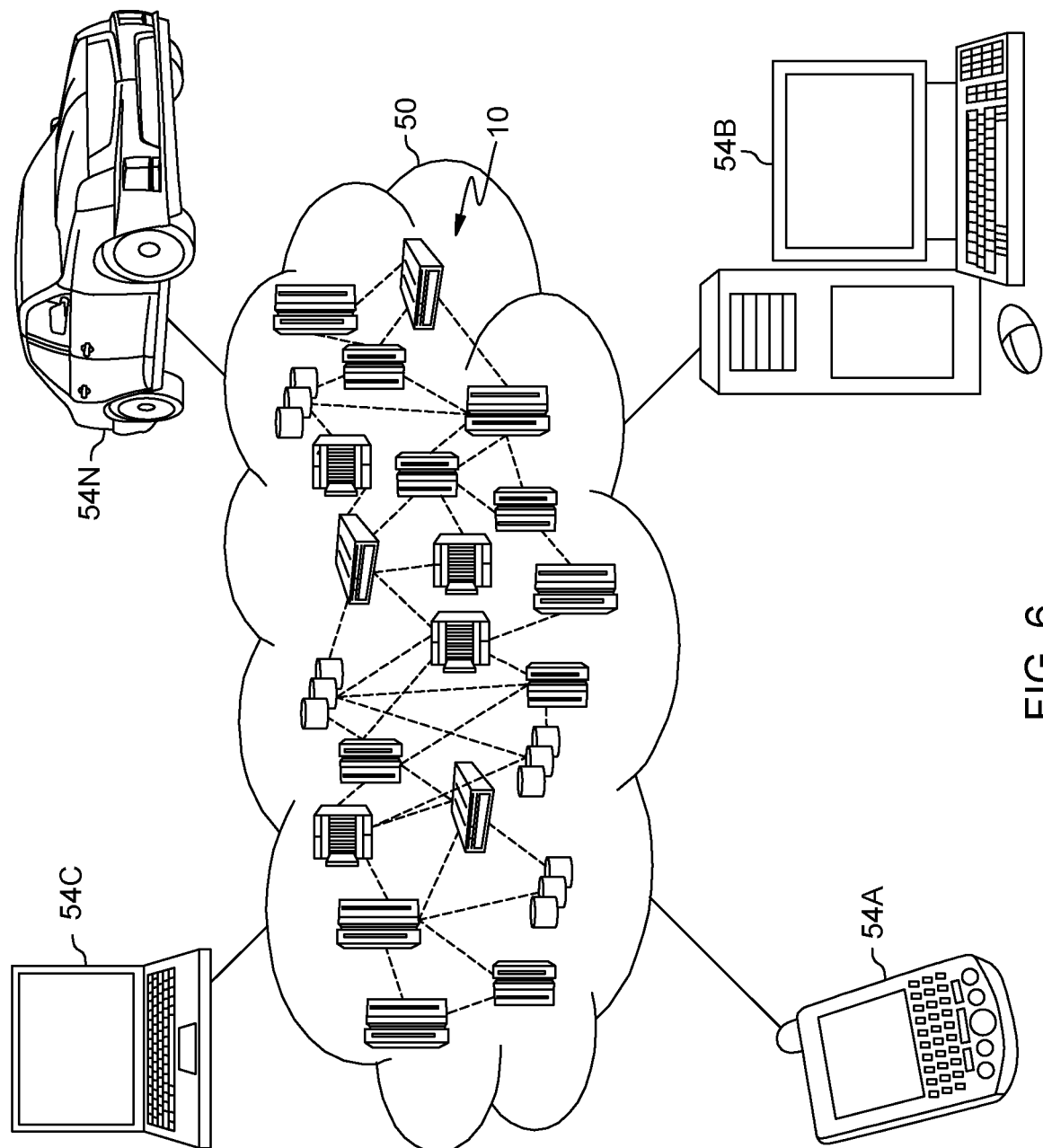
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
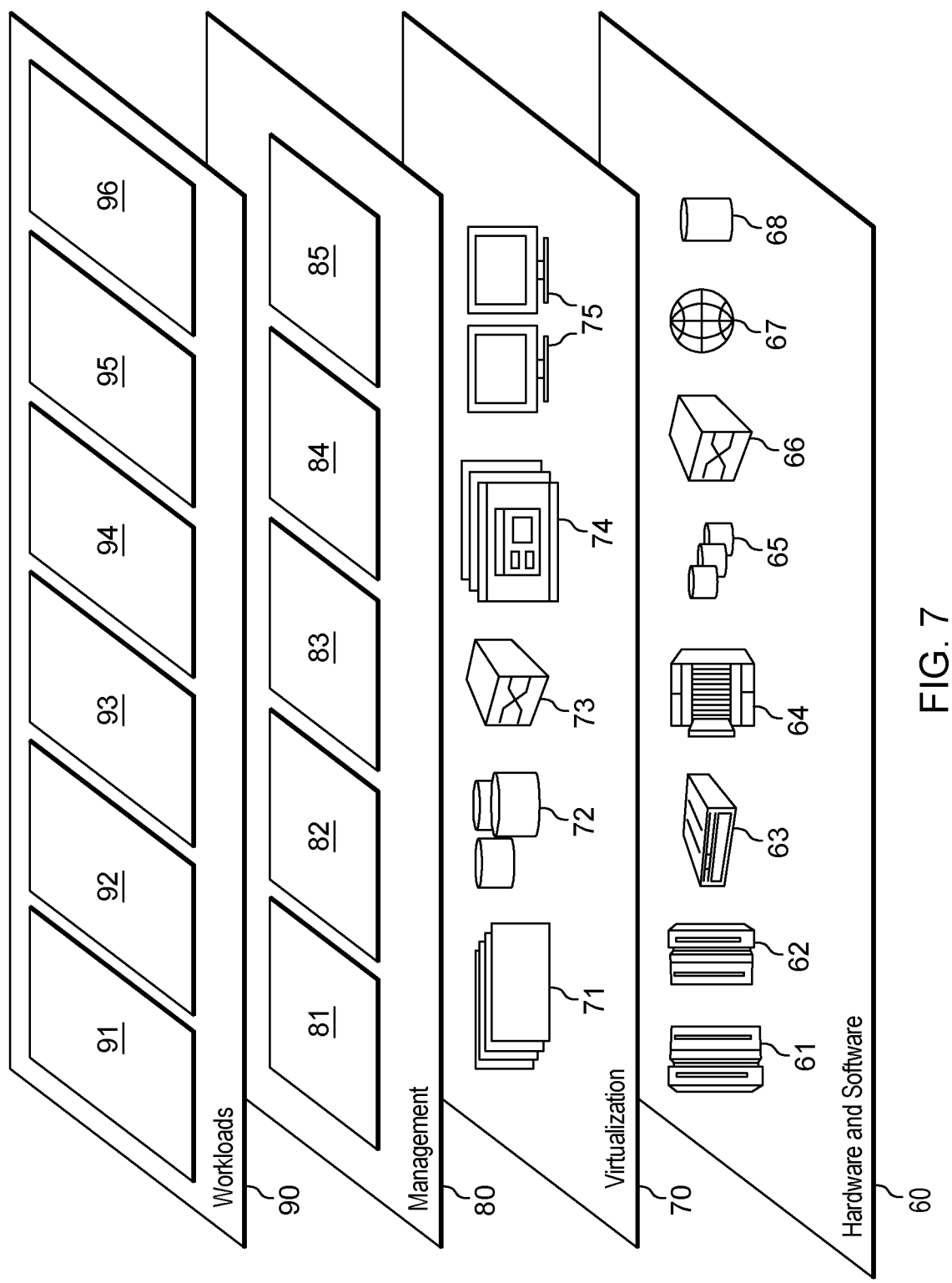
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and verifying a location of a user 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, pre-recorded visual data from a given location, captured by an image capture device at a visual input location at the given location;
   determining, by the one or more processors, a position of the image capture device utilized to capture the visual data;
   obtaining, by the one or more processors, known landmarks from data related to the given location;
   analyzing, by the one or more processors, the visual data to identify a portion of the known landmarks in the visual data, wherein the analyzing comprises utilizing sub-features in the visual data and the data to match known landmarks to objects in the visual data, wherein the sub-features represent temporal physical attributes of the known landmarks, which are present for a given period of time, wherein each pair of matched known landmark to object comprises a matched landmark and wherein the analyzing generates matched landmarks;
   determining, by the one or more processors, utilizing the matched landmarks and the position of the image capture device, a spatial orientation and positioning of the visual input location with respect to the matched landmarks, at the given location;
   generating, by the one or more processors, an encryption key, utilizing the spatial orientation and the positioning of the visual input location with respect to the matched landmarks, wherein the encryption key automatically expires over time based on naturally occurring changes to the physical attributes of the known landmarks;
   encrypting, by the one or more processors, a message with the encryption key generating an encrypted message, wherein a client decrypts the message based on generating a decryption key, wherein the decryption key is generated by the client based on the client being present at the given location during the given period of time, and wherein based on obtaining a decrypted version of the encrypted message from the client, the one or more processors verifies that the client is located at the given location, wherein the client is playing an augmented reality game, and wherein playing the game requires the one or more processors verifying that the client at the given location;
   obtaining, by the one or more processors, a request from the client for verifying that the client is at the given location;
   based on obtaining the request, transmitting, by the one or more processors, the encrypted message to the client, wherein the client attempts to decrypt the message;
   verifying, by the one or more processors, that the client is at the given location based on obtaining a decrypted version of the encrypted message from the client, wherein based on verifying, enabling, by the one or more processors, the client to continue playing the augmented reality game, based on the verifying confirming that the client is at the given location, based on obtaining a decrypted version of the encrypted message from the client; and
   preventing, by the one or more processors, the client from continuing to play the augmented reality game, until completing the verifying.

2. The computer-implemented method of claim 1, wherein the transmitting comprises indicating the position of the image capture device to the client.

3. The computer-implemented method of claim 2, wherein the indicating comprises indicating the position with an element selected from the group consisting of: lights and actuation of an image capture device on the client.

4. The computer-implemented message of claim 2, further comprising:
   generating, by the client, a decryption key, wherein the client utilizes the decryption key to decrypt the encrypted message.

5. The computer-implemented of claim 4, the generating further comprising:
   obtaining, by an image capture device of the client, new visual data, wherein the image capture device of the client is in the position during the obtaining;
   obtaining, by the client, the known landmarks at the given location from the data related to the given location;
   analyzing, by the client, the new visual data to identify the portion of the known landmarks in the new visual data, wherein the analyzing comprises utilizing sub-features in the new visual data and the data to match known landmarks to objects in the new visual data, wherein each pair of matched known landmark to object comprises a new matched landmark and wherein the analyzing generates new matched landmarks, wherein the new matched landmarks comprise the matched landmarks;
   determining, by the client, utilizing the new matched landmarks and the position, a client spatial orientation and positioning with respect to the new matched landmarks, where the client spatial orientation and positioning is equivalent to the spatial orientation and positioning of the visual input location with respect to the matched landmarks, at the given location; and
   generating, by the client, the decryption key, utilizing the client spatial orientation and the positioning.

6. The computer-implemented method of claim 1, wherein the sub-features are selected from the group consisting of: aerials, colors, patterns, text, and shape.

7. The computer-implemented method of claim 1, wherein the sub-features comprise patterns and the patterns are selected from the group consisting of: brickwork and fencing style.

8. The computer-implemented method of claim 1, wherein the visual data is selected from the group consisting of: an image, a series of images, a group of images, and a video.

9. A computer program product comprising:
a computer readable storage medium readable by one or more processors and storing instructions for execution by the one or more processors for performing a method comprising:
obtaining, by the one or more processors, pre-recorded visual data from a given location, captured by an image capture device at a visual input location at the given location;
determining, by the one or more processors, a position of the image capture device utilized to capture the visual data;
obtaining, by the one or more processors, known landmarks from data related to the given location;
analyzing, by the one or more processors, the visual data to identify a portion of the known landmarks in the visual data, wherein the analyzing comprises utilizing sub-features in the visual data and the data to match known landmarks to objects in the visual data, wherein the sub-features represent temporal physical attributes of the known landmarks, which are present for a given period of time, wherein each pair of matched known landmark to object comprises a matched landmark and wherein the analyzing generates matched landmarks;
determining, by the one or more processors, utilizing the matched landmarks and the position of the image capture device, a spatial orientation and positioning of the visual input location with respect to the matched landmarks, at the given location;
generating, by the one or more processors, an encryption key, utilizing the spatial orientation and the positioning of the visual input location with respect to the matched landmarks, wherein the encryption key automatically expires over time based on naturally occurring changes to the physical attributes of the known landmarks;
encrypting, by the one or more processors, a message with the encryption key generating an encrypted message, wherein a client decrypts the message based on generating a decryption key, wherein the decryption key is generated by the client based on the client being present at the given location during the given period of time, and wherein based on obtaining a decrypted version of the encrypted message from the client, the one or more processors verifies that the client is located at the given location, wherein the client is playing an augmented reality game, and wherein playing the game requires the one or more processors verifying that the client at the given location;
obtaining, by the one or more processors, a request from the client for verifying that the client is at the given location;
based on obtaining the request, transmitting, by the one or more processors, the encrypted message to the client, wherein the client attempts to decrypt the message;
verifying, by the one or more processors, that the client is at the given location based on obtaining a decrypted version of the encrypted message from the client, wherein based on verifying, enabling, by the one or more processors, the client to continue playing the augmented reality game, based on the verifying confirming that the client is at the given location, based on obtaining a decrypted version of the encrypted message from the client; and
preventing, by the one or more processors, the client from continuing to play the augmented reality game, until completing the verifying.

10. The computer program product of claim 9, wherein the transmitting comprises indicating the position of the image capture device to the client.

11. The computer program product of claim 10, wherein the indicating comprises indicating the position with an element selected from the group consisting of: lights and actuation of an image capture device on the client.

12. The computer program product of claim 10, further comprising:
generating, by the client, a decryption key, wherein the client utilizes the decryption key to decrypt the encrypted message.

13. The computer program product of claim 12, the generating further comprising:
obtaining, by an image capture device of the client, new visual data, wherein the image capture device of the client is in the position during the obtaining;
obtaining, by the client, the known landmarks at the given location from the data related to the given location;
analyzing, by the client, the new visual data to identify the portion of the known landmarks in the new visual data, wherein the analyzing comprises utilizing sub-features in the new visual data and the data to match known landmarks to objects in the new visual data, wherein each pair of matched known landmark to object comprises a new matched landmark and wherein the analyzing generates new matched landmarks, wherein the new matched landmarks comprise the matched landmarks;
determining, by the client, utilizing the new matched landmarks and the position, a client spatial orientation and positioning with respect to the new matched landmarks, where the client spatial orientation and positioning is equivalent to the spatial orientation and positioning of the visual input location with respect to the matched landmarks, at the given location; and
generating, by the client, the decryption key, utilizing the client spatial orientation and the positioning.

14. The computer program product of claim 9, wherein the sub-features are selected from the group consisting of: aerials, colors, patterns, text, and shape.

15. The computer program product of claim 9, wherein the sub-features comprise patterns and the patterns are selected from the group consisting of: brickwork and fencing style.

16. A system comprising:
a memory;
one or more processors in communication with the memory; and
program instructions executable by the one or more processors via the memory to perform a method, the method comprising:
obtaining, by the one or more processors, pre-recorded visual data from a given location, captured by an image capture device at a visual input location at the given location;
determining, by the one or more processors, a position of the image capture device utilized to capture the visual data;
obtaining, by the one or more processors, known landmarks from data related to the given location;
analyzing, by the one or more processors, the visual data to identify a portion of the known landmarks in the visual data, wherein the analyzing comprises utilizing sub-features in the visual data and the data to match known landmarks to objects in the visual data, wherein the sub-features represent temporal physical attributes of the known landmarks, which are present for a given period of time, wherein each pair of matched known landmark to object comprises a matched landmark and wherein the analyzing generates matched landmarks;

determining, by the one or more processors, utilizing the matched landmarks and the position of the image capture device, a spatial orientation and positioning of the visual input location with respect to the matched landmarks, at the given location;

generating, by the one or more processors, an encryption key, utilizing the spatial orientation and the positioning of the visual input location with respect to the matched landmarks, wherein the encryption key automatically expires over time based on naturally occurring changes to the physical attributes of the known landmarks;

encrypting, by the one or more processors, a message with the encryption key generating an encrypted message, wherein a client decrypts the message based on generating a decryption key, wherein the decryption key is generated by the client based on the client being present at the given location during the given period of time, and wherein based on obtaining a decrypted version of the encrypted message from the client, the one or more processors verifies that the client is located at the given location, wherein the client is playing an augmented reality game, and wherein playing the game requires the one or more processors verifying that the client at the given location;

obtaining, by the one or more processors, a request from the client for verifying that the client is at the given location;

based on obtaining the request, transmitting, by the one or more processors, the encrypted message to the client, wherein the client attempts to decrypt the message;

verifying, by the one or more processors, that the client is at the given location based on obtaining a decrypted version of the encrypted message from the client, wherein based on verifying, enabling, by the one or more processors, the client to continue playing the augmented reality game, based on the verifying confirming that the client is at the given location, based on obtaining a decrypted version of the encrypted message from the client; and preventing, by the one or more processors, the client from continuing to play the augmented reality game, until completing the verifying.

* * * * *